(12) United States Patent
Ravishankar et al.

(10) Patent No.: US 10,938,771 B2
(45) Date of Patent: Mar. 2, 2021

(54) DETERMINING PHYSICAL LOCATIONS OF DEVICES IN A DATA CENTER

(71) Applicant: DELL PRODUCTS, L.P., Round Rock, TX (US)

(72) Inventors: Kanakapura Nanjundaswamy Ravishankar, Bangalore (IN); Muniswamy Setty Krishnaraja Puram Subbaraya Setty, Bangalore (IN); Smruti Ranjan Debata, Jaipur (IN); Shrinidhi Katte, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/853,742

(22) Filed: Dec. 23, 2017

(65) Prior Publication Data
US 2019/0199675 A1  Jun. 27, 2019

(51) Int. Cl.
  *H04L 29/12*  (2006.01)
  *H04L 12/755*  (2013.01)
  *H04L 29/06*  (2006.01)
  *H04L 12/24*  (2006.01)

(52) U.S. Cl.
  CPC .......... *H04L 61/103* (2013.01); *H04L 45/021* (2013.01); *H04L 63/101* (2013.01); *H04L 41/0806* (2013.01); *H04L 61/609* (2013.01); *H04L 61/6022* (2013.01); *H04L 2209/80* (2013.01)

(58) Field of Classification Search
CPC . H04L 61/103; H04L 45/021; H04L 61/6022; H04L 63/101; H04L 41/0806; H04L 2209/80
See application file for complete search history.

(56) References Cited

U.S. PATENT DOCUMENTS

| | | | | |
|---|---|---|---|---|
| 9,591,606 | B1* | 3/2017 | Shetty | G01S 5/0284 |
| 9,949,083 | B1* | 4/2018 | Kirby | H04B 5/0062 |
| 10,015,627 | B1* | 7/2018 | Mossey | H04W 4/02 |
| 10,136,293 | B1* | 11/2018 | Rabii | H04W 4/80 |
| 2008/0076461 | A1* | 3/2008 | Itaya | H04W 40/12 |
| | | | | 455/519 |
| 2008/0272887 | A1* | 11/2008 | Brey | H04L 41/00 |
| | | | | 340/10.1 |
| 2012/0236761 | A1* | 9/2012 | Yang | H04L 61/103 |
| | | | | 370/259 |

(Continued)

*Primary Examiner* — Jeffrey M Rutkowski
*Assistant Examiner* — Jasper Kwoh
(74) *Attorney, Agent, or Firm* — Isidore PLLC

(57) ABSTRACT

A method, an information handling system (IHS) and a data center location system for determining physical locations of devices in a data center. The method includes generating an initial grouping of servers into a plurality of racks based on the at least one of a MAC address or IP address. Each server in a first rack is paired with each other server in communication with a switch aggregator to generate server pairs. The server pairs are transmitted to the respective servers. Each of the servers are triggered to measure and transmit received signal strength indication (RSSI) values for its respective server pairs. Positions of the servers in rows are determined based on the RSSI values. An intermediate grouping of the servers in rows is generated based on the determined positions.

17 Claims, 8 Drawing Sheets

(56) References Cited

U.S. PATENT DOCUMENTS

| | | | |
|---|---|---|---|
| 2012/0303767 A1* | 11/2012 | Renzin | G06F 15/177 |
| | | | 709/220 |
| 2013/0031559 A1* | 1/2013 | Alicherry | G06F 9/5066 |
| | | | 718/104 |
| 2013/0235519 A1* | 9/2013 | Miyauchi | H05K 7/20745 |
| | | | 361/679.46 |
| 2014/0064104 A1 | 3/2014 | Nataraja et al. | |
| 2014/0179340 A1* | 6/2014 | Do | G01S 13/765 |
| | | | 455/456.1 |
| 2015/0094085 A1* | 4/2015 | Agrawal | A01K 1/0114 |
| | | | 455/456.1 |
| 2016/0103198 A1* | 4/2016 | Swope | G01S 3/28 |
| | | | 342/372 |
| 2016/0380834 A1 | 12/2016 | Peng et al. | |
| 2017/0006410 A1* | 1/2017 | Barrett | H04L 69/18 |
| 2017/0076581 A1* | 3/2017 | Felch | G08B 21/245 |
| 2017/0134349 A1 | 5/2017 | Ahmed et al. | |
| 2017/0139032 A1* | 5/2017 | Rößl | G01S 5/02 |
| 2017/0180206 A1 | 6/2017 | Ahmed et al. | |
| 2017/0187574 A1 | 6/2017 | Subramanian et al. | |
| 2017/0215038 A1* | 7/2017 | Primm | H04W 4/023 |
| 2017/0317908 A1* | 11/2017 | Jose | H04W 4/70 |

* cited by examiner

| Server Pair 410 | RSSI Value 420 |
|---|---|
| SVR 228 / SVR 288 | -65 |
| SVR 228 / SVR 268 | -63 |
| SVR 228 / SVR 248 | -62 |

| Server Pair 410 | RSSI Value 420 |
|---|---|
| SVR 228 / SVR 248 | -62 |
| SVR 228 / SVR 268 | -63 |
| SVR 228 / SVR 288 | -65 |

| SVR 224 | SVR 244 |
| SVR 226 | SVR 246 |
| SVR 228 | SVR 248 |
| SVR 230 | SVR 250 |
| SVR 232 | SVR 252 |

| SVR 228 | SVR 248 |

| SVR 228 | SVR 248 | SVR 268 | SVR 288 |

DETERMINING PHYSICAL LOCATIONS OF DEVICES IN A DATA CENTER

BACKGROUND

1. Technical Field

The present disclosure generally relates to information handling systems and in particular to determining the physical location of information handling system devices in a data center.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system can be a distributed information handling system located in a data center. The distributed information handling system can include a computer network having hundreds or thousands of computers, servers, or computing nodes that are in communication with each other over a communications network. When a data center having thousands of computing nodes is set-up or configured, each computing node has to be physically mapped to a logical address or attribute such as a media access control (MAC) address or an internet protocol (IP) address. For various reasons, such as trouble shooting and repairs of failing nodes, etc., it is helpful to know where each node is physically located. However, the logical mapping does not correlate to a physical location and thus determining the physical location of each computing node is difficult and time consuming.

BRIEF SUMMARY

Disclosed are a method, an information handling system (IHS) and a data center location system for determining physical locations of devices in a data center.

According to one embodiment, the method includes retrieving, via a management computer processor, a list of at least one switch aggregator and a plurality of servers communicatively coupled to the switch aggregator within the data center. The list further includes at least one of a media access control (MAC) address or an internet protocol (IP) address associated with each of the servers. An initial grouping of the servers into a plurality of racks is generated based on the at least one of the MAC address or the IP address. Each server in a first rack is paired with each other server in communication with a first switch aggregator to generate server pairs. Each of the servers are triggered to measure received signal strength indication (RSSI) values between the respective server pairs for the first switch aggregator. The method further includes receiving, at the management computer processor, the RSSI values for each of the server pairs and determining positions of the servers in at least one row based on the received RSSI values. An intermediate grouping of the servers in the at least one row is generated based on the determined positions. The intermediate grouping of servers in the at least one row contains the physical locations of the servers in the same row at least partially based on the measured RSSI values.

According to another embodiment, an IHS includes a plurality of racks. Each of the racks contains a top of rack (TOR) switch that is communicatively coupled to a plurality of servers in the rack. At least one switch aggregator is communicatively coupled to each of the TOR switches. A management computer is communicatively coupled to the switch aggregator. The management computer includes a processor and a memory device communicatively coupled to the processor. The memory device stores data center ordering firmware. The data center ordering firmware configures the processor to retrieve a list of at least one switch aggregator and a plurality of servers communicatively coupled to the switch aggregator within the data center. The list further includes at least one of a media access control (MAC) address or an internet protocol (IP) address associated with each of the servers. An initial grouping of the servers into a plurality of racks is generated based on the at least one of the MAC address or the IP address. Each server in a first rack is paired with each other server in communication with a first switch aggregator to generate server pairs. Each of the servers are triggered to measure received signal strength indication (RSSI) values between the respective server pairs for the first switch aggregator. The data center ordering firmware further configures the processor to receive the RSSI values for each of the server pairs and to determine positions of the servers in at least one row based on the received RSSI values. An intermediate grouping of the servers in the at least one row is generated based on the determined positions. The intermediate grouping of servers in the at least one row contains the physical locations of the servers in the same row at least partially based on the measured RSSI values.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 4A illustrates an example table of server pairs and corresponding relative signal strength indicator values, according to one or more embodiments;

FIG. 4B illustrates an example table of sorted server pairs and corresponding relative signal strength indicator values, according to one or more embodiments;

FIG. 5A illustrates an example initial ordering of rows of servers, according to one or more embodiments;

FIG. 5B illustrates an example intermediate ordering of rows of servers, according to one or more embodiments;

FIG. 5C illustrates an example final ordering of rows of servers, according to one or more embodiments;

DETAILED DESCRIPTION

Figure 1:
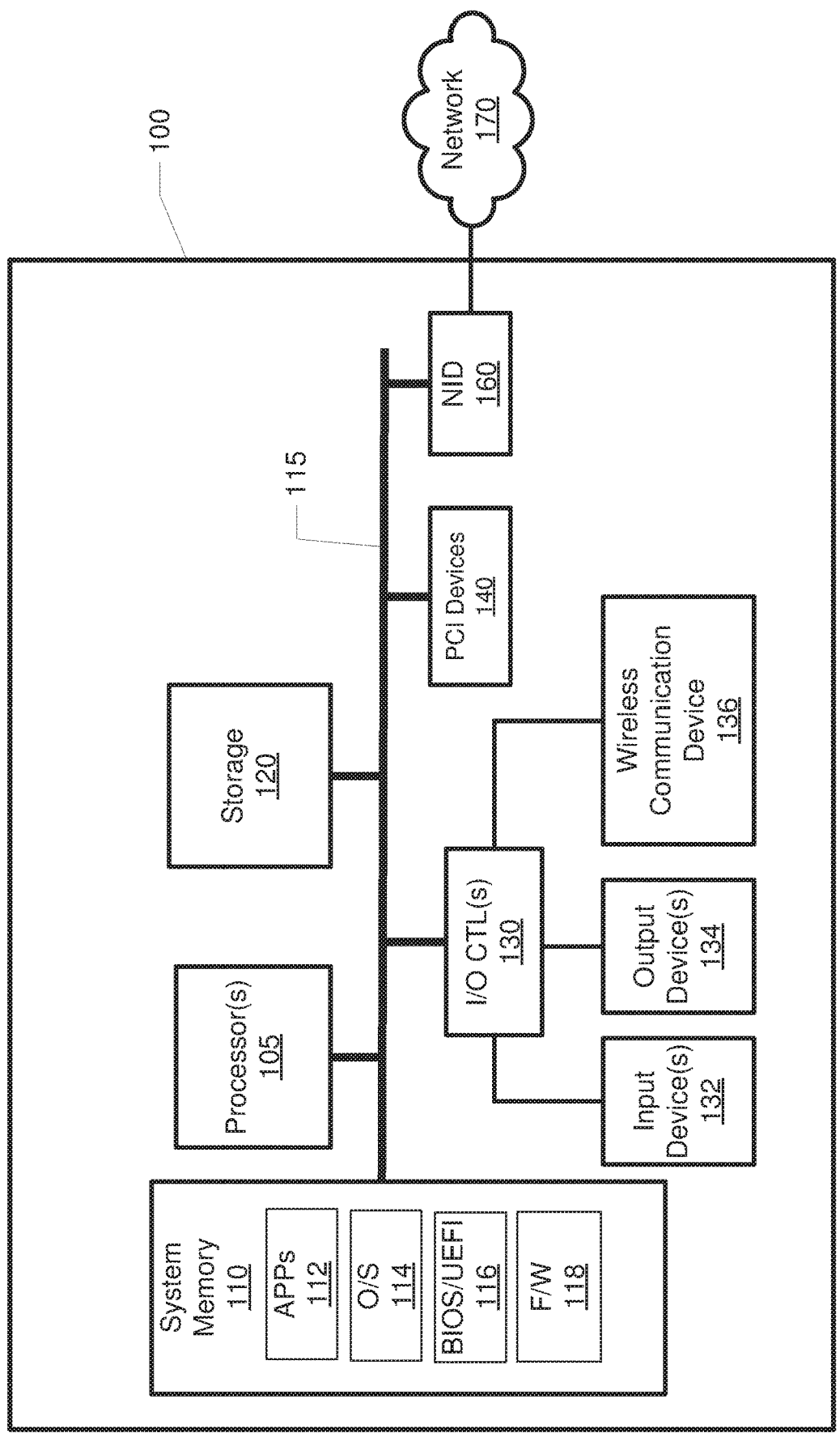
FIG. 1 illustrates one example of an IHS within which various aspects of the disclosure can be implemented, according to one or more embodiments.

The illustrative embodiments provide a method, an information handling system (IHS) and a data center location system for determining physical locations of devices in a data center. The method includes retrieving, via a management computer processor, a list of at least one switch aggregator and a plurality of servers communicatively coupled to the switch aggregator within the data center. The list further includes at least one of a media access control (MAC) address or an internet protocol (IP) address associated with each of the servers. An initial grouping of the servers into a plurality of racks is generated based on the at least one of the MAC address or the IP address. Each server in a first rack is paired with each other server in communication with a first switch aggregator to generate server pairs. The server pairs are transmitted to the respective servers. Each of the servers are triggered to measure received signal strength indication (RSSI) values between the server pairs for the first switch aggregator. The method further includes receiving, at the management computer processor, the RSSI values for each of the server pairs and determining positions of the servers in at least one row based on the received RSSI values. An intermediate grouping of the servers in the at least one row is generated based on the determined positions. The intermediate grouping of servers in the at least one row contains the physical locations of the servers in the same row at least partially based on the measured RSSI values.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can include one or more hard drives or solid state drives that are mounted within a system enclosure as will be described below. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs). I/O controllers 130 further support the connection and processing of signals to and from wireless communication device (WCD) 136. In one embodiment, WCD 136 can be a transmitter/receiver (transceiver) such as a Bluetooth device or a near field communication (NFC) that provides for wireless communications. WCD 136 can allow IHS 100 to communicate wirelessly with other IHSs having compatible WCDs that support NFC or Bluetooth communications. In one embodiment, WCD 136 can be physically coupled to I/O controllers 130 via a universal serial bus (USB) connector. Additionally, in one or more embodiments, system interconnect 115 is further coupled to peripheral component interconnect (PCI) devices 140. PCI devices 140 can include modems, network cards, sound cards, video cards, shared memory, solid state drives and other hardware devices.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
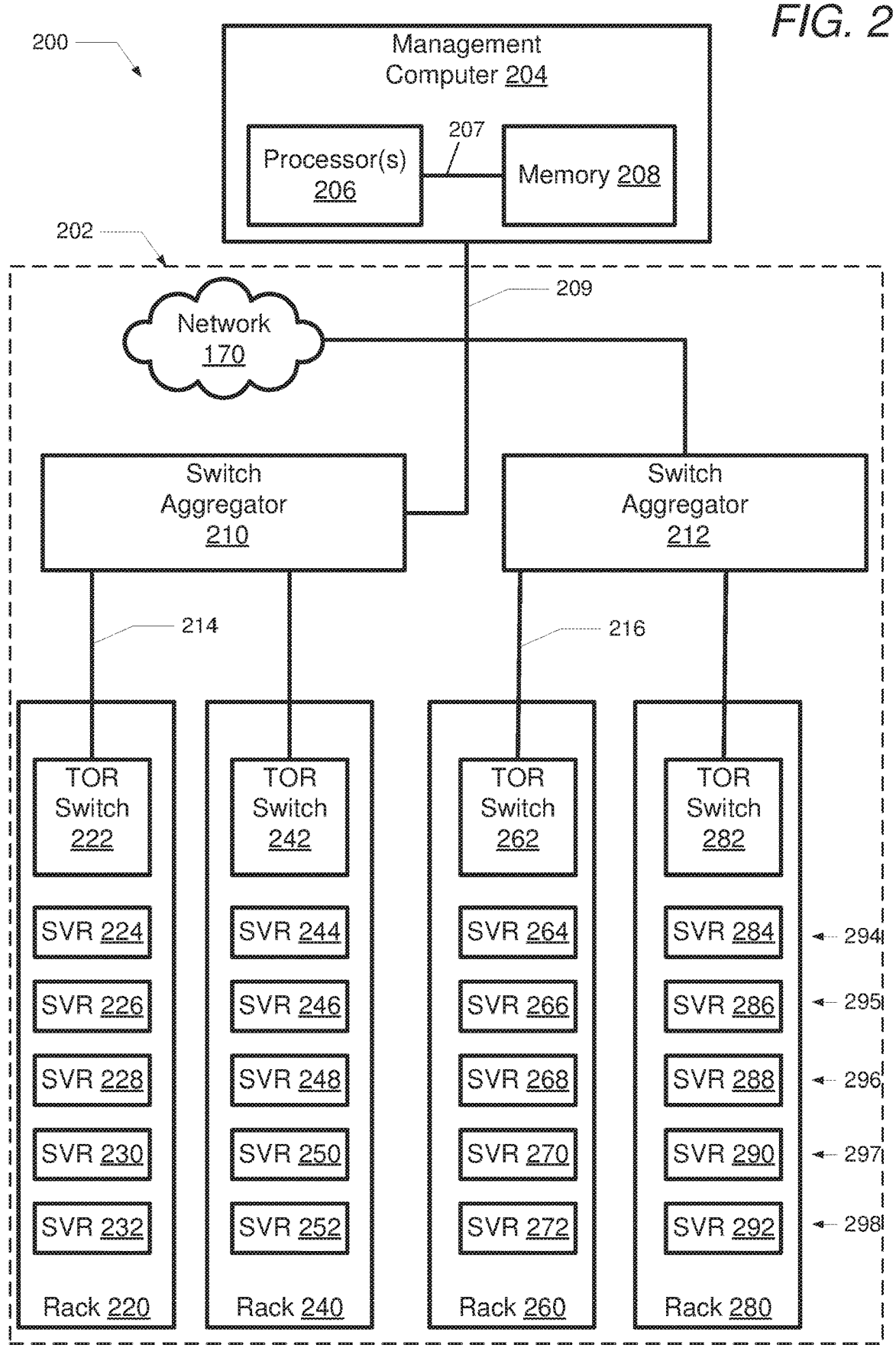
FIG. 2 illustrates an example data center including a management computer and a networked computing system, according to one or more embodiments.

In the discussion of the following figures, the description of each figure can include general reference to the specific components illustrated within the preceding figures. Turning to FIG. 2, a data center 200 including a networked computing system 202 is shown. Networked computing system 202 comprises network 170, management IHS or computer 204, switch aggregators 210, 212 and racks 220, 240, 260 and 280. Management computer 204 is communicatively coupled to network 170 and switch aggregators 210 and 212 via one or more electrical or optical cables and/or connectors 209. Management computer 204 can control and manage the operation of networked computing system 202 including various functions such as workload distribution, software updates and security. Management computer 204 includes one or more processor(s) 206 coupled to memory 208 via system interconnect 207. In one embodiment, management computer 204 can have can the same components and architecture as IHS 100 (FIG. 1) except that processor 105 has been replaced by processor 206 and system memory 110 has been replaced by system memory 208.

Switch aggregator 210 is communicatively coupled to racks 220 and 240 via one or more electrical or optical cables and/or connectors 214. Switch aggregator 212 is communicatively coupled to racks 260 and 280 via one or more electrical or optical cables and/or connectors 216. Switch aggregators 210 and 212 are switches that combine or distribute communication packets from other switches. The switch aggregators are switches that provide connectivity for several other switches that are connected to switch aggregator. In one embodiment, switch aggregators 210 and 212 can handle L2 (data link layer) and L3 (network layer) processing.

Rack 220 includes a top of rack (TOR) switch 222 and servers 224, 226, 228, 230 and 232. TOR switch 222 is communicatively coupled to switch aggregator 210. TOR switch 222 and the other TOR switches are switch devices that use packet switching to receive, process, and forward data from an originating device to a destination device. In one embodiment, TOR switch 222 can handle L2 (data link layer) processing. Each of servers 224, 226, 228, 230 and 232 are in communication with TOR switch 222. In one embodiment, each of the servers 224, 226, 228, 230 and 232 can have the same components and architecture as IHS 100. In one embodiment, the term server and IHS can be used to refer to the same device.

Rack 240 includes a TOR switch 242 and servers 244, 246, 248, 250 and 252. TOR switch 242 is communicatively coupled to switch aggregator 210. Each of servers 244, 246, 248, 250 and 252 are in communication with TOR switch 242. In one embodiment, each of the servers 244, 246, 248, 250 and 252 can have the same components and architecture as IHS 100.

Rack 260 includes a TOR switch 262 and servers 264, 266, 268, 270 and 272. TOR switch 262 is communicatively coupled to switch aggregator 212. Each of servers 264, 266, 268, 270 and 272 are in communication with TOR switch 262. In one embodiment, each of the servers 264, 266, 268, 270 and 272 can have the same components and architecture as IHS 100.

Rack 280 includes a TOR switch 282 and servers 284, 286, 288, 290 and 292. TOR switch 282 is communicatively coupled to switch aggregator 212. Each of servers 284, 286, 288, 290 and 292 are in communication with TOR switch 282. In one embodiment, each of the servers 284, 286, 288, 290 and 292 can have the same components and architecture as IHS 100.

Within data center 200, the servers are arranged in columns that correspond to each of racks 220, 240, 260 and 280 and are arranged in server rows or rows 294, 295, 296, 297 and 298.

Figure 3B:
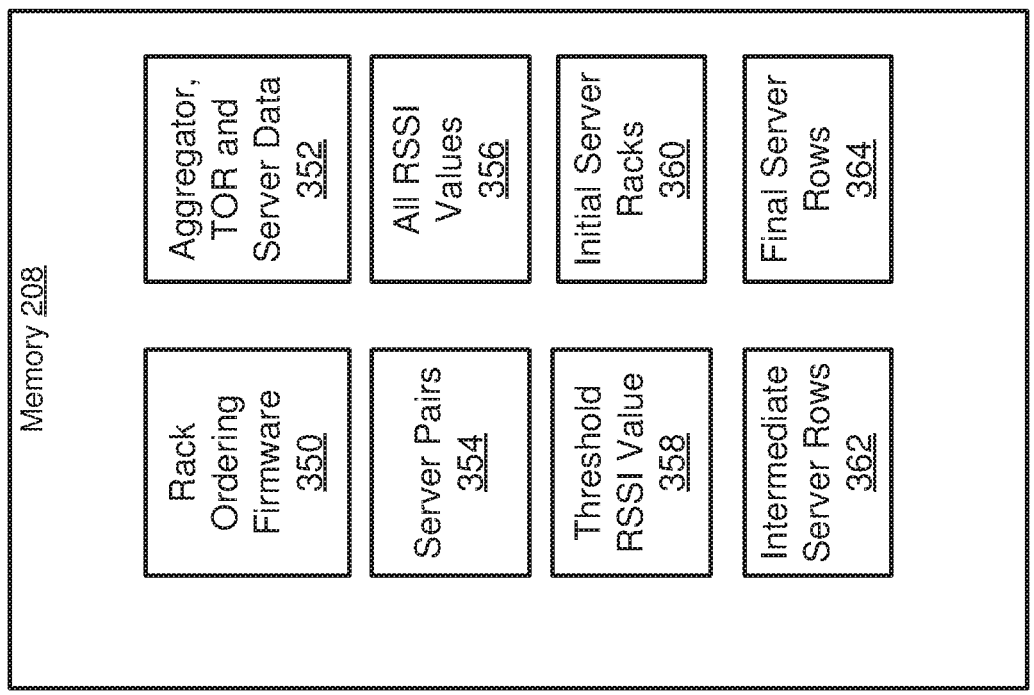
FIG. 3B illustrates example contents of a management computer memory, in accordance with one embodiment.
Figure 3A:
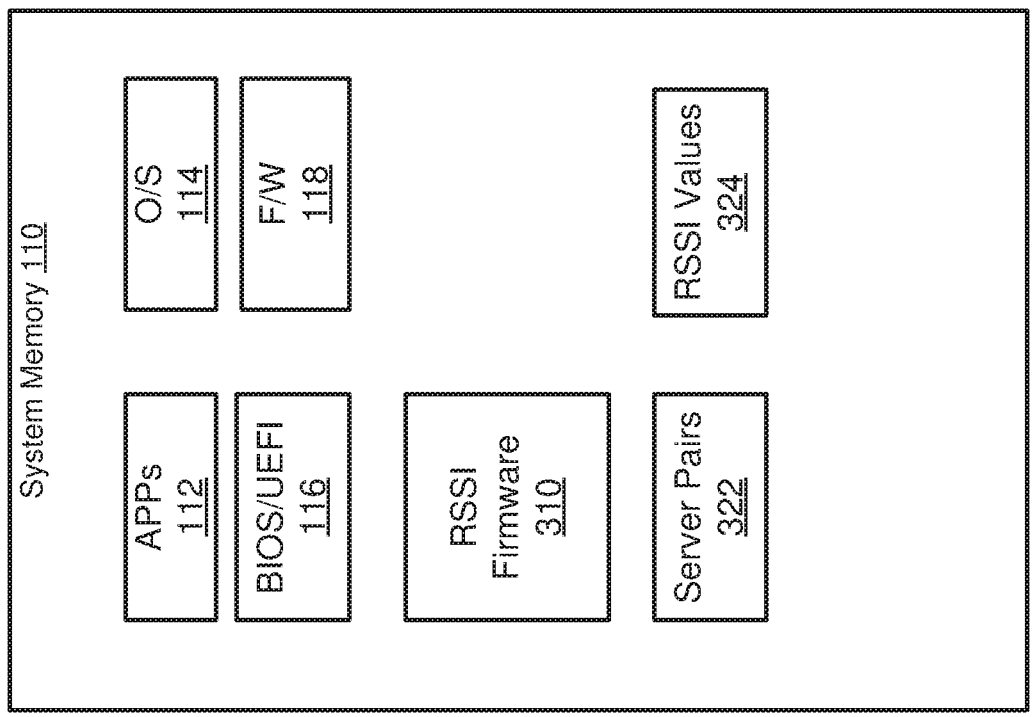
FIG. 3A illustrates example contents of a server system memory, in accordance with one embodiment.

With reference now to FIG. 3A, an example of contents of system memory 110 (FIG. 1) is shown. In one embodiment, system memory 110 can correspond to the system memory of server 224. Servers 224-292 can each include a system memory having similar contents to system memory 110. System memory 110 can include application(s) 112, O/S 114, BIOS 116 and F/W 118. System memory 110 further includes received signal strength indicator (RSSI) firmware 310, server pairs 322 and RSSI values 324. Servers 224-292 can each have the same architecture and components as IHS 100. The processors within each of servers 224-292 (e.g., processor 105) can each execute RSSI firmware 310 contained in their respective system memory (e.g. system memory 110), as part of determining physical locations of servers in data center 200.

Server pairs 322 represent the identity of a group of two servers for each of the servers within data center 200. The identity of one server from one rack (i.e. rack 220) is paired with the identity of another server from another rack (i.e. rack 240) to generate a server pair. Each of the servers in a rack are paired with another server from different racks to generate server pairs. The server pairs are generated for all of the servers within a data center 200. The servers are paired in order to measure RSSI values between each of the servers and determine physical locations of the servers based on RSSI values. RSSI values 324 are the measured RSSI values between the server pairs. RSSI is the relative received signal strength in a wireless environment, in arbitrary units. RSSI is an indication of the power level being received by the receiving wireless communication device after any antenna loss. One of the servers (i.e. the transmitting server) in the server pair 322 transmits a wireless signal via WCD 136 to the other server (i.e. receiving server) in the server pair. The receiving server receives the wireless signal via its own respective WCD 136 and measures the signal strength (i.e. RSSI value) of the received wireless signal. When a new datacenter is setup, the exact physical location of servers is not known. The RSSI value can be used to determine the physical locations of servers in data center 200. Server pairs having lower RSSI values indicate weaker wireless signals and the two servers in the server pair are physically located further apart. Server pairs having higher RSSI values indicate stronger wireless signals and the two servers in the server pair are physically located closer together. The highest RSSI value for a server pair indicates that the two servers in the server pair are physically adjacent to each other in the same row, but in different racks.

With reference now to FIG. 3B, one embodiment of example contents of management computer memory 208 (FIG. 2) is shown. Management computer memory 208 can include rack ordering firmware 350, aggregator, TOR and server data 352, server pairs 354 and RSSI values 356. Processor 206 can execute rack ordering firmware 350 to determine the physical locations of servers in data center 200. Aggregator, TOR and server data 352 includes a list of the identity, type and number of switch aggregators, racks, TORs and servers within data center 200 and includes media access control (MAC) addresses and internet protocol (IP) addresses of these devices. Server pairs 354 are the identity of the server pairs for all of the servers within data center 200. Server pairs 354 are generated based on one of the MAC or IP address. RSSI values 356 are all of the RSSI values for all of the server pairs within data center 200.

Memory 208 further includes threshold RSSI value 358, initial server racks 360, intermediate server rows 362 and final server rows 364. Threshold RSSI value 358 is a pre-determined RSSI value which corresponds to the RSSI value for the minimum distance between servers in adjacent racks. In one embodiment, neighboring servers can be determined by selecting the highest RSSI value which is greater than or equal to the threshold RSSI value for a server pair.

Initial server racks 360 are the initial ordering of racks, by processor 206 executing rack ordering firmware 350, based on MAC addresses or IP addresses. The MAC or IP address can be used to initially group the servers into initial non-precise locations. Intermediate server rows 362 are a secondary ordering of servers in horizontal rows across racks, by processor 206 executing rack ordering firmware 350, based on RSSI values for servers in communication with a specific single switch aggregator. Final server rows 364 are the final ordering of servers in horizontal rows across racks, by processor 206 executing rack ordering firmware 350, based on RSSI values for all of the servers across multiple switch aggregators within data center 200.

FIG. 4A illustrates a table 400 of server pairs 410 and corresponding RSSI values 420. For the server pair of server 228 and server 288, the RSSI value is −65 decibels (dB). For the server pair of server 228 and server 268, the RSSI value is −63 dB. For the server pair of server 228 and server 248, the RSSI value is −62 dB. Turning to FIG. 4B, a sorted table 450 of server pairs 410 and corresponding RSSI values 420 are shown. Server pairs having the highest RSSI value are first in the table and server pairs having the lowest RSSI value are last in the table. From sorted table 450, the server pair having the highest RSSI value can be readily identified. Sorted table 450 illustrates that the server pair of server 228 and 248 have the highest RSSI value (smallest negative dB value) and are therefore physically adjacent each other in a row.

FIG. 5A illustrates an initial ordering 510 of servers in racks. Each of the servers that are communicatively coupled to a switch aggregator are arranged into an initial ordering of racks. Initial ordering 510 includes servers 224-232 in rack 220 and servers 244-252 in rack 240 based on their associated MAC address or IP address. FIG. 5B illustrates an intermediate or secondary ordering 520 of a row of servers. The intermediate or secondary ordering 520 of a row of servers of FIG. 5B occurs after the initial ordering 510 of FIG. 5A. Each of the servers that are communicatively coupled to a single switch aggregator are positioned or arranged into an intermediated ordering of rows based on RSSI values. Intermediate ordering 520 includes server 228 and server 248 arranged in the same row based on their associated RSSI values. FIG. 5C illustrates a final ordering 530 of a row of servers. The final ordering 530 of a row of servers of FIG. 5C occurs after the intermediate ordering 520 of FIG. 5B. Each of the servers that are communicatively coupled to multiple or all of the switch aggregators are arranged into a final ordering of rows. The final ordering 530 occurs by identifying servers that are at the end of rows for each switch aggregator, determining RSSI values for server pairs at the end of rows and positioning the servers into rows based on RSSI values across all of the switch aggregators. Final ordering 530 includes server 228, server 248, server 268 and server 288 arranged in the same row.

According to one embodiment, rack ordering firmware 350 executes on processor 206. Processor 206 retrieves a list (aggregator, TOR and server data 352) of at least one switch aggregator 210 and a plurality of servers 224-232 and 244-252 communicatively coupled to the switch aggregator within data center 200. The list further includes at least one of a media access control (MAC) address or an internet protocol (IP) address associated with each of the servers. Processor 206 groups or generates the servers into a plurality of initial server racks 360 based on at least one of the MAC address or the IP address. The initial server racks are an initial but non-precise proxy for the general location of the racks/servers. For example, as shown in FIG. 5A, processor 206 has generated one initial server rack (i.e. initial ordering 510). Processor 206 pairs each server in a first rack with another server in the other racks (for one switch aggregator) to generate server pairs 354. Processor 206 transmits the server pairs to the respective servers. Processor 206 triggers each of the servers to measure RSSI values 324 for its respective server pair. Processor 206 receives all of the RSSI values 356 for each of the server pairs and determines positions of the servers in rows based on the received RSSI values. Processor 206 groups or generates intermediate server rows 362 based on the determined positions. The intermediate server rows 362 contain the physical locations of the servers in rows at least partially based on the measured RSSI values. Processor 206 generates intermediate server rows for each of the switch aggregators. For example, as shown in FIG. 5B, processor 206 has generated one intermediate server row (i.e. intermediate ordering 520).

Processor 206 identifies servers that are at the ends of rows for each switch aggregator, and processor 206 pairs the end of row servers in one rack of one switch aggregator with another end of row server in another rack of another switch aggregator to generate server pairs. Processor 206 transmits the server pairs to the respective servers. Processor 206 triggers each of the servers to measure RSSI values 324 for its respective server pair. Processor 206 receives all of the RSSI values 356 for each of the server pairs and determines positions of servers at the end of rows across multiple switch aggregators, based on the received RSSI values. Processor 206 groups or generates final server rows 364 based on the determined positions. For example, as shown in FIG. 5C, processor 206 has generated one final server row (i.e. final ordering 530).

Figure 6:
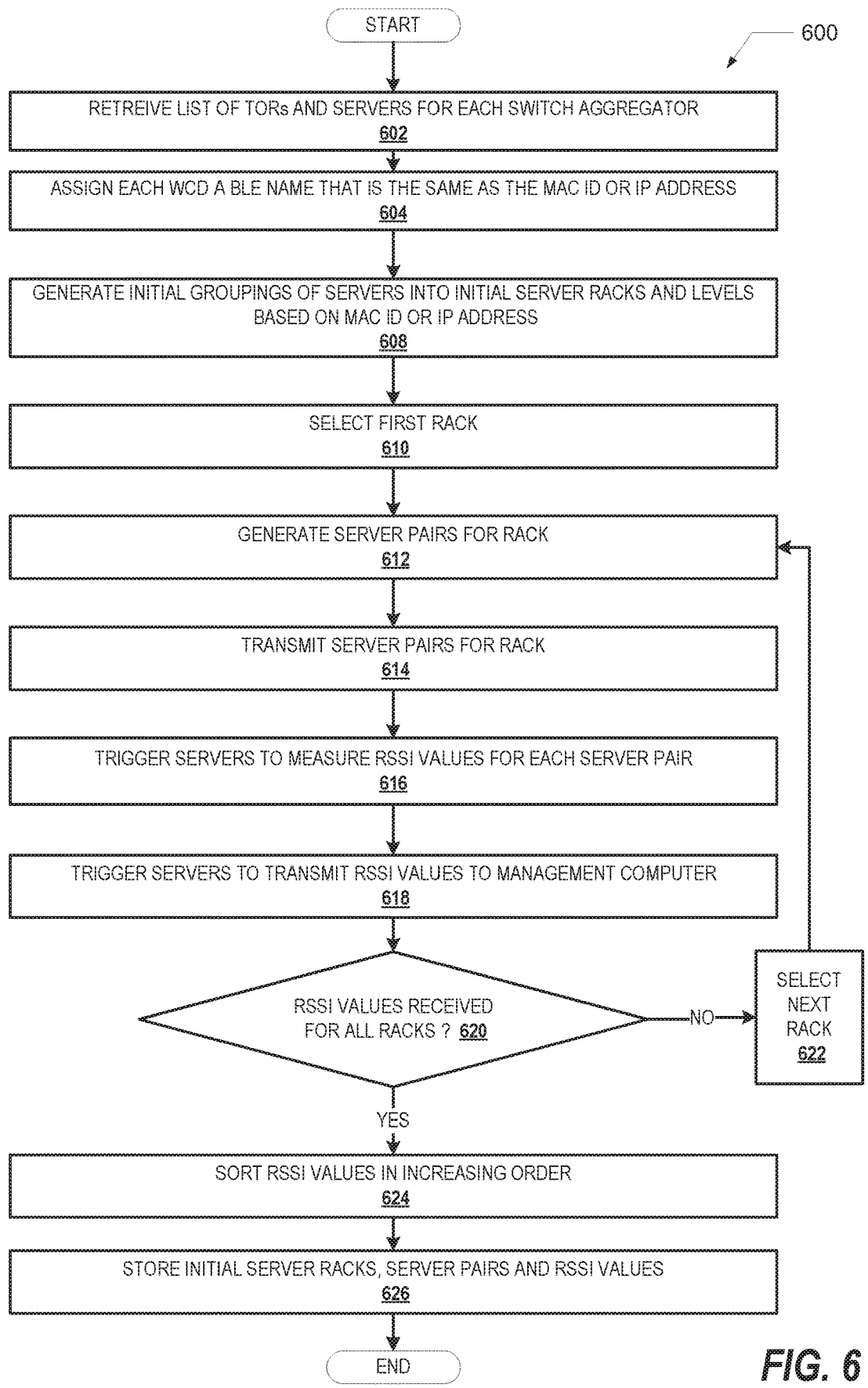
FIG. 6 is a flow chart illustrating one example of a method for determining relative signal strength indicator values for server pairs, according to one or more embodiments.
Figure 7:
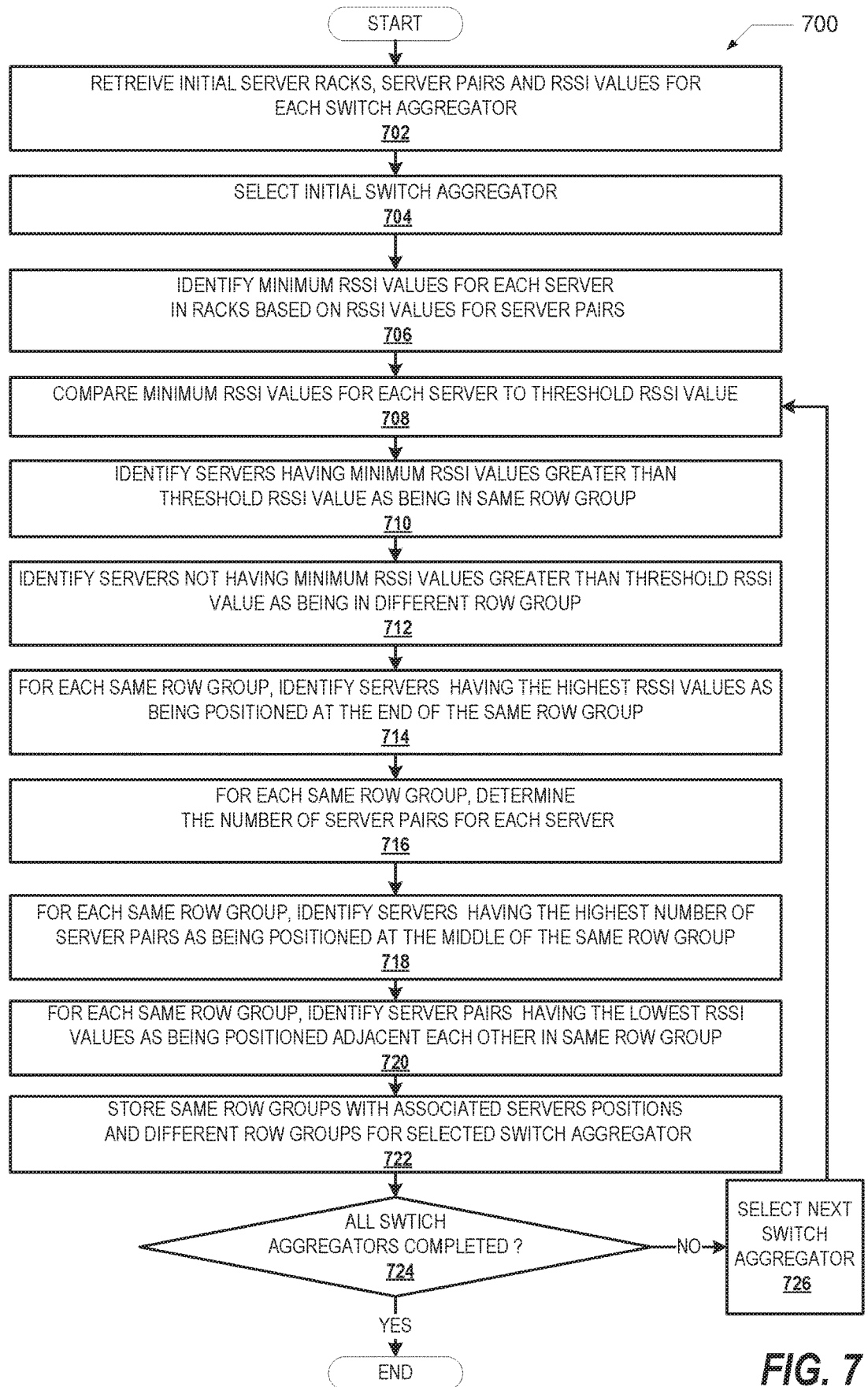
FIG. 7 is a flow chart illustrating one example of a method for determining physical locations of servers that are communicatively coupled to a switch aggregator, according to one or more embodiments.
Figure 8:
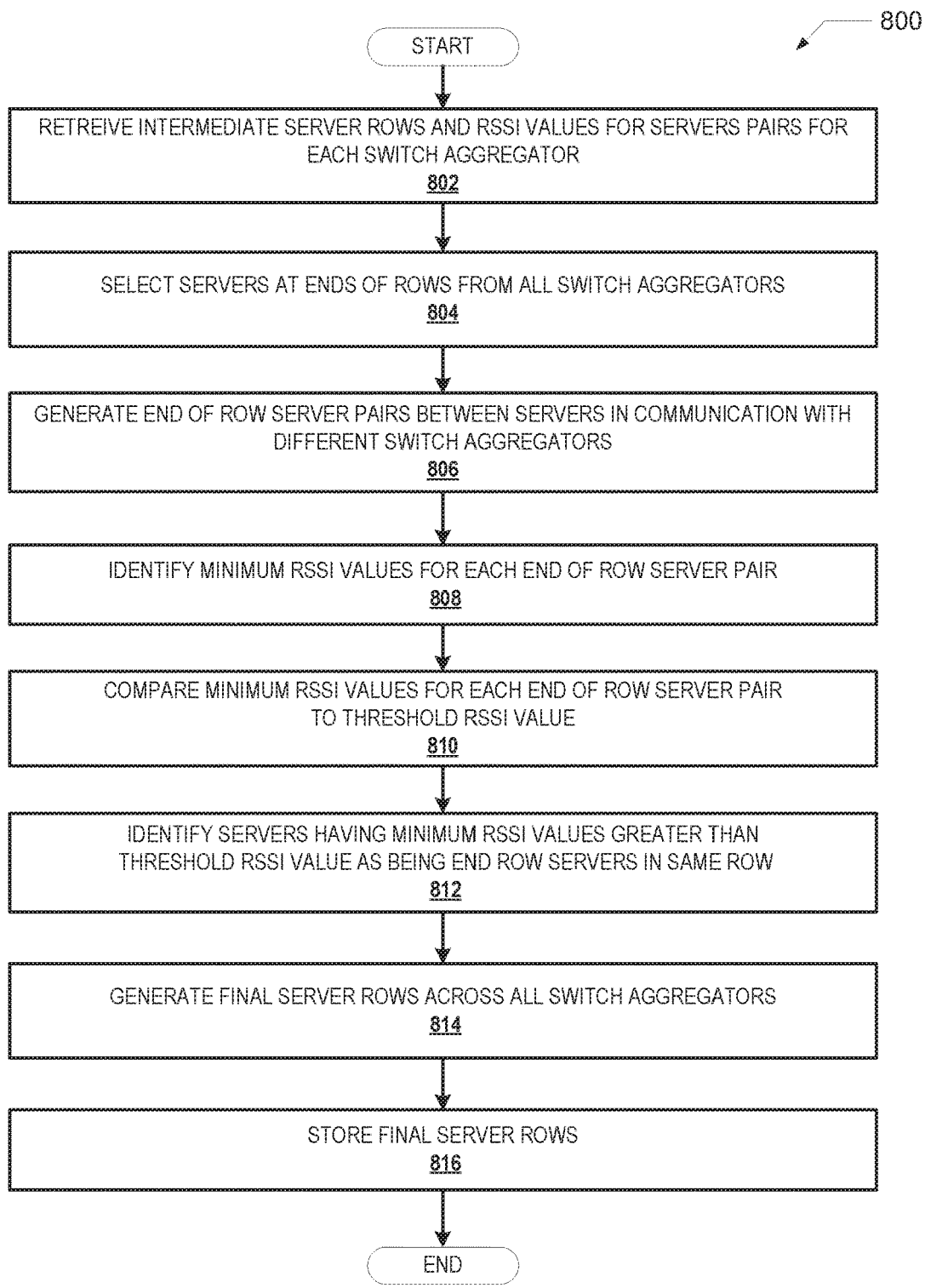
FIG. 8 is a flow chart illustrating one example of a method for determining physical locations of servers in a data center, according to one or more embodiments.

FIGS. 6, 7, and 8 illustrate flowcharts of exemplary methods 600, 700 and 800 by which processor 206 within the preceding figures performs different aspects of the processes that enable the one or more embodiments of the disclosure. Generally, method 600 represents a computer-implemented method for determining RSSI values for server pairs. Method 700 represents a computer-implemented method for determining physical locations of servers that are communicatively coupled to a single switch aggregator. Method 800 represents a computer-implemented method for determining physical locations of servers across multiple switch aggregators in a data center. The description of methods 600, 700 and 800 is provided with general reference to the specific components illustrated within the preceding FIGS. 1-5C. Generally, methods 600, 700 and 800 are described as being implemented via processor 206 and particularly the execution of code provided by rack ordering firmware 350 within processor 206. It is however appreciated that certain aspects of the described methods may be implemented via other processing devices and/or execution of other code.

Referring to the flow chart of FIG. 6, method 600 begins at the start block and proceeds to block 602 where processor 206 retrieves switch aggregator, TOR and server data 252 from memory 208. Processor 206 assigns each WCD 136 of each server a Bluetooth low energy (BLE) name that is the same as the server MAC or IP address (block 604). Processor 206 generates initial groupings of servers into initial server racks 360 for the servers in communication with each of the switch aggregators based on the server MAC or IP address (block 608). The initial server racks 360 also contain an approximate level or height position that the server is in within the rack. Because the server MAC or IP addresses are generally structured in sequence within a rack, the approximate level or height position of the server within the rack can be ascertained.

Processor 206 selects a first rack of servers (block 610) and generates server pairs 354 for the first rack (i.e. rack 220) by pairing each server in the first rack with all of the other servers that are in communication with the same switch aggregator and that are approximately at the same level (i.e. servers of rack 240) (block 612). Processor 206 transmits the respective server pairs 354 (i.e., the identity of the paired servers) to each of the respective servers in the first rack (block 614). Server pairs 322 represent the identity of a group of two servers for each of the servers across rows within data center 200. The servers are paired in order to measure RSSI values between each of the servers and determine physical locations of the servers based on RSSI values. Processor 206 triggers the servers to measure RSSI values 324 using WCD 136 for the received server pairs 354 (block 616). One of the servers (i.e. transmitting server) in the server pair transmits a wireless signal to the other server (i.e. receiving server) in the server pair. The receiving server measures the signal strength (i.e. RSSI value) of the received wireless signal. Processor 206 triggers the servers to transmit the measured RSSI values 324 to management computer 204 (block 618). At decision block 620, processor 206 determines if the measured RSSI values 324 have been received for all of the initial server racks 360.

In response to the measured RSSI values 356 not being received for all of the racks, processor 206 selects the next rack from initial server racks 360 (block 622) and returns to block 612 to generate server pairs for the next rack. Blocks 612-618 repeat until all of the racks have completed measuring RSSI values for their respective server pairs. In response to the measured RSSI values 356 being received for all of racks, processor 206 sorts the server pairs and their associated RSSI values 356 into an increasing (or decreasing) order (i.e. table 450) (block 624). Processor 206 stores server pairs 354, RSSI values 356 and initial server racks 360 to memory 208 (block 626). Method 600 then ends.

FIG. 7 illustrates a method 700 for determining physical locations of servers that are communicatively coupled to one switch aggregator. Method 700 begins at the start block and proceeds to block 702 where processor 206 retrieves server pairs 354, RSSI values 356 and initial server racks 360 from memory 208. Processor 206 selects one of the switch aggregators (e.g. switch aggregator 210) as an initial switch aggregator (block 704). Processor 206 identifies minimum RSSI values for each server in each of the racks (block 706). Processor 206 compares the minimum RSSI values for each server in each of the initial server racks 360 to threshold RSSI value 358 (block 708). The threshold RSSI value 358 is the pre-determined value for the minimum distance between servers in adjacent racks. In one embodiment, adjacent servers can be determined by selecting the server pair having the highest RSSI value that is greater than or equal to the threshold RSSI value.

Processor 206 identifies servers that have minimum RSSI values greater (less negative dB value) than the threshold RSSI value 358 as being in the same row in intermediate server rows 362 (block 710). Processor 206 identifies servers that have minimum RSSI values less (more negative dB value) than the threshold RSSI value 358 as being in a different row within intermediate server rows 362 (block 712). If the RSSI value associated with a server pair is less than the threshold value, those servers are not in the same horizontal row. Processor 206 identifies servers of the sever pairs that have the lowest RSSI values greater (less negative dB value) than the threshold RSSI value 358 as being servers positioned at the ends of the row (same row) and orders or positions these servers in intermediate server rows 362 (block 714).

Processor 206 counts or determines the number of server pairs 354 for each server in the same row within intermediate server rows 362 (block 716). Processor 206 identifies servers having the highest number of servers pairs 354 as being positioned toward the middle of the same row within intermediate server rows 362 (block 718). Processor 206 identifies server pairs having the lowest RSSI values (less negative dB value) as being ordered or positioned adjacent each other in the same row within intermediate server rows 362 (block 720). Processor 206 stores the identified server positions to intermediate server rows 362 (block 722).

Processor 206 determines if the intermediate server rows 362 have been determined or completed for all of the switch aggregators (decision block 724). Method 700 then terminates at the end block. In response to determining that the intermediate server rows 362 have not been determined or completed for all of the switch aggregators, processor 206 selects the next switch aggregator and returns to block 708 to start the process again of determining server positions within intermediate server rows for the next switch aggregator by comparing the minimum RSSI values for each server to threshold RSSI value 358. In response to determining that the intermediate server rows 362 have been determined or completed for all of the switch aggregators, method 700 terminates at the end block.

FIG. 8 illustrates a method 800 for determining physical locations (positions in rows) of servers in data center 200 having multiple switch aggregators. Method 800 begins at the start block and proceeds to block 802 where processor 206 retrieves intermediate server rows 362, server pairs 354, and RSSI values 356 from memory 208 for all of the switch aggregators. Processor 206 selects servers from the ends of the rows within intermediate server rows 362 for all of the switch aggregators (e.g. switch aggregators 210 and 212) (block 804). Processor 206 generates server pairs between servers at the ends of rows (i.e. servers 248 and 268) that are in communication with different switch aggregators (block 806). Processor 206 identifies minimum RSSI values for each end of row server pair in each of the rows (block 808).

Processor 206 identifies servers pairs in each of the rows that have minimum RSSI values greater (less negative dB value) than the threshold RSSI value 358 as being in the same row. Processor 206 compares the minimum RSSI values for each end of row server pair identified in block 808 to threshold RSSI value 358 (block 810). The threshold RSSI value 358 is the pre-determined value for the minimum distance between servers in adjacent racks. Processor 206 identifies end of row server pairs in each of the rows that have minimum RSSI values greater (less negative dB value) than the threshold RSSI value 358 as being in the same row across the switch aggregators (i.e. row 296) (block 812). The servers identified in block 812 as being in the same row are adjacent servers (i.e. servers 248 and 268) that each are in communication with different switch aggregators. Processor 206 generates data of final server rows 364 based on intermediate server rows 362 and the end of row server pairs that have been identified as being adjacent each other in block 812 (block 814). The processor determines positions of servers at the end of rows across multiple switch aggregators based on the received RSSI values and groups or generates final server rows 364 based on the determined positions. For example, as shown in FIG. 5C, processor 206 has generated one final server row (i.e. final ordering 530). The final server rows 364 contain the final determined positions of servers in rows across all of the switch aggregators in data center 200. Processor 206 stores the final server rows 364 to memory 208 (block 816). Method 800 then ends. Method 800 determines which of the intermediate server rows are in the same row (i.e. adjacent each) across multiple switch aggregators.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of determining physical locations of servers in a data center, the method comprising:

retrieving, via a management computer processor, a list of at least one switch aggregator and a plurality of servers communicatively coupled to the switch aggregator within the data center, the list further including at least one of a media access control (MAC) address or an internet protocol (IP) address associated with each of the servers;

generating an initial grouping of the servers into a plurality of adjacent racks based on the at least one of the MAC address or the IP address;

pairing each server in a first rack with each other server in communication with a first switch aggregator to generate server pairs;

triggering each of the servers to measure, using a wireless communication device (WCD), received signal strength indication (RSSI) values of a received wireless signal transmitted between the respective server pairs, the WCD of a respective server enabling the respective server to transmit and receive wireless signals with other servers that have a compatible wireless communication device;

receiving, at the management computer processor, the measured RSSI values for each of the server pairs;

determining positions of the servers in at least one row of servers coupled to the switch aggregator, the row extending across adjacent racks, the positions in the row based on the received RSSI values for the server pairs, with servers of the server pairs having a lowest RSSI value among the received RSSI values, greater than a threshold RSSI value, positioned at end sections of the row of servers coupled to the switch aggregator;

generating an intermediate grouping of the servers in the at least one row based on the determined positions, the intermediate grouping of servers in the at least one row containing the physical locations of the servers in the same row at least partially based on the measured RSSI values, wherein the generating of the intermediate grouping of servers comprises: identifying a minimum RSSI value between each of the servers in the switch aggregator; and in response to the minimum RSSI value for a server in the first switch aggregator being less than the threshold RSSI value, identifying the server as being in the same row, the server pairs having minimum RSSI values less than or equal to the threshold RSSI value being indicative of servers that are in the same row;

comparing the minimum RSSI value for each of the server in the first switch aggregator to the threshold RSSI value, the threshold RSSI value being a predetermined RSSI value which corresponds to a minimum distance between servers in adjacent racks;

identifying servers in a server pair as being in a different row, if the minimum RSSI value for the server is greater than the threshold RSSI value;

identifying server pairs as being at an end of the switch aggregator if the respective RSSI values are the highest RSSI values for the switch aggregator, the server pairs having the highest RSSI values being indicative of servers that are at the ends of the switch aggregator; and determining and storing final server rows across the plurality of adjacent racks to memory, the final server rows presenting a location of each server within each row of servers across the plurality of adjacent racks.

2. The method of claim 1, wherein generating an intermediate grouping of the servers in the at least one row comprises:

generating intermediate groupings of the servers in a plurality of rows for each of the switch aggregators.

3. The method of claim 1, further comprising:

sorting the RSSI values for the server pairs associated with the first switch aggregator into a decreasing order; and identifying the server having a lowest among the highest RSSI value among the servers as being indicative of the server that is physically located in the center of a row.

4. The method of claim 1, further comprising:

identifying servers having highest values of the number of server pairs and having the minimum of the highest RSSI values, as being positioned approximately in the middle of the row; and identifying servers having lowest RSSI values as being positioned approximately adjacent each other in the row.

5. The method of claim 1, further comprising:

generating a final ordering of the servers for all of the switch aggregators based at least partially on the intermediate grouping of servers for each of the switch aggregators.

6. The method of claim 5, wherein generating the final ordering of server rows for all of the switch aggregators further comprises:

identifying servers at the ends of the rows and other rows for each of the switch aggregators;

pairing servers at the ends of each of the rows with servers at the ends of other rows for each of the switch aggregators to generate row end server pairs between the switch aggregators;

identifying a minimum RSSI value for each of the servers in the row end server pairs based on the RSSI values for the row end server pairs; and comparing the minimum RSSI value for each of the servers in the row end server pairs to the threshold RSSI value;

identifying servers at the ends of the rows for each switch aggregator; and generating final server rows for each row across all of the switch aggregators based on the RSSI values of the row end server pairs.

7. An information handling system (IHS) comprising:

a plurality of racks, each of the racks containing a top of rack (TOR) switch that is communicatively coupled to a plurality of servers in the rack;

at least one switch aggregator communicatively coupled to each of the TOR switches;

a management computer communicatively coupled to the switch aggregator, the management computer including a processor and a memory device communicatively coupled to the processor, the memory device storing data center ordering firmware, wherein the data center ordering firmware configures the processor to:

retrieve a list of at least one switch aggregator and a plurality of adjacent servers communicatively coupled to the switch aggregator within the data center, the list further including at least one of a media access control (MAC) address or an internet protocol (IP) address associated with each of the servers;

generate an initial grouping of the servers into a plurality of racks based on the at least one of the MAC address or the IP address;

pair each server in a first rack with each other server in a first switch aggregator to generate server pairs;

trigger each of the servers to measure, using a wireless communication device (WCD), received signal strength indication (RSSI) values of a received wireless signal transmitted between the respective server pairs for the first switch aggregator, the WCD of a respective server enabling the respective server to transmit and receive wireless signals with other servers that have a compatible wireless communication device;

receive, at the management computer processor, the RSSI values for each of the server pairs;

determine positions of the servers in at least one row of servers coupled to the switch aggregator, the row extending across adjacent racks, the positions in the row based on the received RSSI values for the server pairs, with servers of the server pairs having a lowest RSSI value among the received RSSI values, greater than a threshold RSSI value, positioned at end sections of the row of servers coupled to the switch aggregator;

generate an intermediate grouping of the servers in the at least one row based on the determined positions, the intermediate grouping of servers in the at least one row containing the physical locations of the servers in the same row at least partially based on the measured RSSI values, wherein to generate the intermediate grouping the processor: identifies a minimum RSSI value for each of the servers in the first switch aggregator based on the RSSI values for each of the server pairs; and in response to the minimum RSSI value for a server being less than the threshold RSSI value, identifies the server as being in the same row, the server pairs having minimum RSSI values less than or equal to the threshold RSSI value being indicative of servers that are in the same row;

compare the minimum RSSI value for each of the servers to the threshold RSSI value, the threshold RSSI value being a predetermined RSSI value which corresponds to a minimum distance between servers in adjacent racks;

identify servers in a server pair as being in a different row, if the minimum RSSI value for the server is greater than the threshold RSSI value;

identify server pairs as being at an end of the switch aggregator, if the respective RSSI value are the highest RSSI value for the switch aggregator, the server pairs having the highest RSSI value being indicative of servers that are at the ends of the switch aggregator row; and determine and store final server rows across the plurality of adjacent racks to memory.

8. The information handling system of claim 7, wherein the data center ordering firmware further configures the processor to:
generate the intermediate grouping of the servers in a plurality of rows for each of the switch aggregators.

9. The information handling system of claim 7, wherein the data center ordering firmware further configures the processor to:
sort the RSSI values for the server pairs associated with the first switch aggregator into decreasing order, the server having the lowest of the highest RSSI value being indicative of the server that is physically located in the center of a row.

10. The information handling system of claim 7, wherein the data center ordering firmware further configures the processor to:
identify server having highest values of the number of server pairs and having the minimum of the highest RSSI values of the server pairs as being positioned approximately in the middle of the row for the switch aggregator; and
identify servers having lowest RSSI values as being positioned approximately adjacent each other in the row.

11. The information handling system of claim 7, wherein the data center ordering firmware further configures the processor to:
generate a final ordering of the servers for all of the switch aggregators based at least partially on the intermediate grouping of severs for each of the switch aggregators.

12. The information handling system of claim 11, wherein generating the final ordering of servers for all of the switch aggregators further comprises the data center ordering firmware further configuring the processor to:
identify servers at the ends of the rows for each of the switch aggregators;
pair servers at the ends of each of the rows with servers at the ends of other rows for each of the switch aggregators to generate row end server pairs between the switch aggregators;
identify a minimum RSSI value for each of the servers in the row end server pairs based on the RSSI values for the row end server pairs;
compare the minimum RSSI value for each of the servers in the row end server pairs to the threshold RSSI value;
identify servers at the ends of the rows for each switch aggregator; and
generate final server rows for each row across all of the switch aggregators based on the RSSI values of the row end server pairs.

13. A data center location system comprising:
a plurality of racks, each of the racks containing a top of rack (TOR) switch that is communicatively coupled to a plurality of servers in the rack;
at least one switch aggregator communicatively coupled to each of the TOR switches;
a management computer communicatively coupled to the switch aggregator, the management computer including a processor and a memory device communicatively coupled to the processor, the memory device storing data center ordering firmware, wherein the data center ordering firmware configures the processor to:
retrieve a list of at least one switch aggregator and a plurality of servers communicatively coupled to the switch aggregator within the data center, the list further including at least one of a media access control (MAC) address or an internet protocol (IP) address associated with each of the servers;
generate an initial grouping of the servers into a plurality of racks based on the at least one of the MAC address or the IP address;
pair each server in a first rack with each other server in a first switch aggregator to generate server pairs;
trigger each of the servers to measure, using a wireless communication device (WCD), received signal strength indication (RSSI) values of a received wireless signal transmitted between the respective server pairs for the first switch aggregator, the WCD of a respective server enabling the respective server to transmit and receive wireless signals with other servers that have a compatible wireless communication device;
receive, at the management computer processor, the RSSI values for each of the server pairs;
determine positions of the servers in at least one row of servers coupled to the switch aggregator, the row extending across adjacent racks, the positions in the row based on the received RSSI values for the server pairs, with servers of the server pairs having a lowest RSSI value among the received RSSI values, greater than a threshold RSSI value, positioned at end sections of the row of servers coupled to the switch aggregator;
generate an intermediate grouping of the servers in the at least one row based on the determined positions, the intermediate grouping of servers in the at least one row containing the physical locations of the servers in the same row at least partially based on the measured RSSI values, wherein to generate the intermediate grouping the processor: identifies a minimum RSSI value for each of the servers in the first switch aggregator based on the RSSI values for each of the server pairs; and in response to the minimum RSSI value for a server being less than the threshold RSSI value, identifies the server as being in the same row, the server pairs having minimum RSSI values less than or equal to the threshold RSSI value being indicative of servers that are in the same row;
compare the minimum RSSI value for each of the servers to the threshold RSSI value, the threshold RSSI value being a predetermined RSSI value which corresponds to a minimum distance between servers in adjacent racks;
identify servers of a server pair as being in a different row, if the minimum RSSI value for the server is greater than the threshold RSSI value, the server pairs having minimum RSSI values greater than the threshold RSSI value being indicative of servers that are in different rows;
identify servers as being at an end of the switch aggregator, if the respective RSSI values are the highest RSSI values for the switch aggregator, the server pairs having the highest RSSI values being indicative of servers that are at the ends of the switch aggregator; and
determine and store final server rows across the plurality of adjacent racks to memory.

14. The data center location system of claim 13, wherein the data center ordering firmware further configures the processor to:
generate the intermediate grouping of the servers in a plurality of rows for each of the switch aggregators.

15. The data center location system of claim 13, wherein the data center ordering firmware further configures the processor to:
sort the RSSI values for the server pairs associated with the first switch aggregator into a decreasing order, the server having the lowest of the highest RSSI value being indicative of the server that is physically located in the center of a row.

16. The data center location system of claim 13, wherein the data center ordering firmware further configures the processor to:
identify servers having highest values of the number server pairs and having the minimum of the highest RSSI values as being positioned approximately in the middle of the row; and
identify servers having lowest RSSI values as being positioned approximately adjacent each other in the row.

17. The data center location system of claim 13, wherein the data center ordering firmware further configures the processor to:
generate a final ordering of the servers for all of the switch aggregators based at least partially on the intermediate grouping of severs for each of the switch aggregators.

* * * * *